United States Patent
Zheng et al.

(10) Patent No.: US 11,735,159 B2
(45) Date of Patent: Aug. 22, 2023

(54) VOICE OUTPUT DEVICE AND VOICE OUTPUT METHOD

(71) Applicant: ALPS ALPINE CO., LTD., Tokyo (JP)

(72) Inventors: Hongda Zheng, Dalian (CN); Xiao Liu, Dalian (CN)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/329,972

(22) Filed: May 25, 2021

(65) Prior Publication Data

US 2022/0020354 A1 Jan. 20, 2022

(30) Foreign Application Priority Data

Jul. 17, 2020 (CN) .......................... 202010689914.9

(51) Int. Cl.
*G10L 13/04* (2013.01)
*B60Q 9/00* (2006.01)

(52) U.S. Cl.
CPC ................ *G10L 13/04* (2013.01); *B60Q 9/00* (2013.01)

(58) Field of Classification Search
CPC .................................. G10L 13/04; B06Q 9/00
USPC .......................................................... 704/260
See application file for complete search history.

(56) References Cited

U.S. PATENT DOCUMENTS

| | | | | |
|---|---|---|---|---|
| 9,497,269 | B2 * | 11/2016 | Seo ..................... | H04N 21/4312 |
| 2010/0031284 | A1 * | 2/2010 | Miyaki ............ | H04N 21/41407 |
| | | | | 705/26.1 |
| 2013/0218553 | A1 * | 8/2013 | Fujii ...................... | G10L 25/87 |
| | | | | 704/235 |

FOREIGN PATENT DOCUMENTS

| | | | |
|---|---|---|---|
| KR | 20160123612 A | * | 10/2016 |
| WO | WO 2014/002128 | | 1/2014 |

OTHER PUBLICATIONS

L. Rosenthal, L. Rabiner, R. Schafer, P. Cummiskey and J. Flanagan, "A multiline computer voice response system utilizing ADPCM coded speech," in IEEE Transactions on Acoustics, Speech, and Signal Processing, vol. 22, No. 5, pp. 339-352, Oct. 1974, doi: 10.1109/TASSP.1974.1162597. (Year: 1974).*

T. M. Moran, "Formatted voice messages in tactical communication," [1992] Proceedings of the Tactical Communications Conference, 1992, pp. 165-170 vol.1, doi: 10.1109/TCC.1992.247149. (Year: 1992).*

T. M. Moran, "Formatted voice messages in tactical communication," [1992] Proceedings of the Tactical Communications Conference, 1992, pp. 165-170 vol.1, doi: 10.1109/TCC.1992.247149. (Year: 1992) (Year: 1992).*

(Continued)

*Primary Examiner* — Bharatkumar S Shah
(74) *Attorney, Agent, or Firm* — Crowell & Moring LLP

(57) ABSTRACT

A voice output device includes a voice output controller configured to determine, when a message reception unit receives a message, whether a start condition to be satisfied when a person intended to receive the message normally listens to voice in the predetermined space is satisfied, and cause a voice output unit to start voice output of the message when the start condition is satisfied and suspend voice output of the message when the start condition is not satisfied. The voice output is not immediately performed in response to a reception of a message but is performed only when the person intended to receive the message normally listens to the message, and the voice output of the message is suspended in other cases.

21 Claims, 10 Drawing Sheets

(56) References Cited

OTHER PUBLICATIONS

T. M. Moran, "Formatted voice messages in tactical communication," [1992] Proceedings of the Tactical Communications Conference, 1992, pp. 165-170 vol.1, doi: 10.1109/TCC.1992.247149. (Year: 1992) (Year: 1992) (Year: 1992).*

L. Rosenthal, L. Rabiner, R. Schafer, P. Cummiskey and J. Flanagan, "A multiline computer voice response system utilizing ADPCM coded speech," in IEEE Transactions on Acoustics, Speech, and Signal Processing, vol. 22, No. 5, pp. 339-352, Oct. 1974, doi: 10.1109/TASSP.1974.1162597. (Year: 1974) (Year: 1974).*

T. M. Moran, "Formatted voice messages in tactical communication," [1992] Proceedings of the Tactical Communications Conference, 1992, pp. 165-170 vol.1, doi: 10.1109/TCC.1992.247149. (Year: 1992) (Year: 1992) (Year: 1992) (Year: 1992).*

* cited by examiner

VOICE OUTPUT DEVICE AND VOICE OUTPUT METHOD

RELATED APPLICATION

The present application claims priority to Chinese Patent Application Number 202010689914.9, filed Jul. 17, 2020, the entirety of which is hereby incorporated by reference.

BACKGROUND

1. Field of the Invention

The present disclosure relates to voice output devices and voice output methods, and is suitably applied to a voice output device and method having a function of outputting a received message by voice.

2. Description of the Related Art

In general, voice output devices that are installed in a space, such as an in-vehicle space formed in a vehicle or a room of a house, and that have a function of receiving messages in chat applications and messages (mails) in mail systems have been used. Such a voice output device outputs, when receiving a message, the content of the message by voice. Such a voice output device normally outputs a message by voice immediately after receiving the message so that a person intended to receive the message may immediately recognize the content of the message in response to the reception of the message. Note that International Publication No. WO 2014/002128 describes an onboard information device that recognizes speech content of voice of a passenger in a vehicle and outputs the speech content of the voice in a method according to an environment surrounding the vehicle or a vehicle traveling state.

However, the voice output device according to the related art described above outputs a message by voice immediately after receiving the message, and therefore, the voice output is performed at any time in response to reception of the message even in a situation in which the person intended to receive the message is unable to listen to the message or unable to concentrate on listening to the message. Accordingly, the person intended to receive the message may miss the message.

SUMMARY

Accordingly, it is an object of the present disclosure to address such a problem and to avoid failure of listening to a message by a person intended to receive the message.

According to an aspect of the present disclosure, a voice output device that is disposed in a predetermined space and that includes a voice output unit configured to perform voice output determines, when receiving a message, whether a start condition to be satisfied in a state in which a person intended to receive the message normally listens to voice in the predetermined space is satisfied, and causes the voice output unit to start voice output of the message when the start condition is satisfied and to suspend voice output of the message when the start condition is not satisfied.

Specifically, according to the present disclosure having the configuration described above, the voice output is not immediately performed in response to reception of a message but is performed only in a state in which the message is normally considered, and voice output of the message is suspended in other states. Therefore, the situation in which the person intended to receive the message misses the message may be avoided.

DETAILED DESCRIPTION OF THE PREFERRED EMBODIMENTS

First Embodiment

Figure 1:
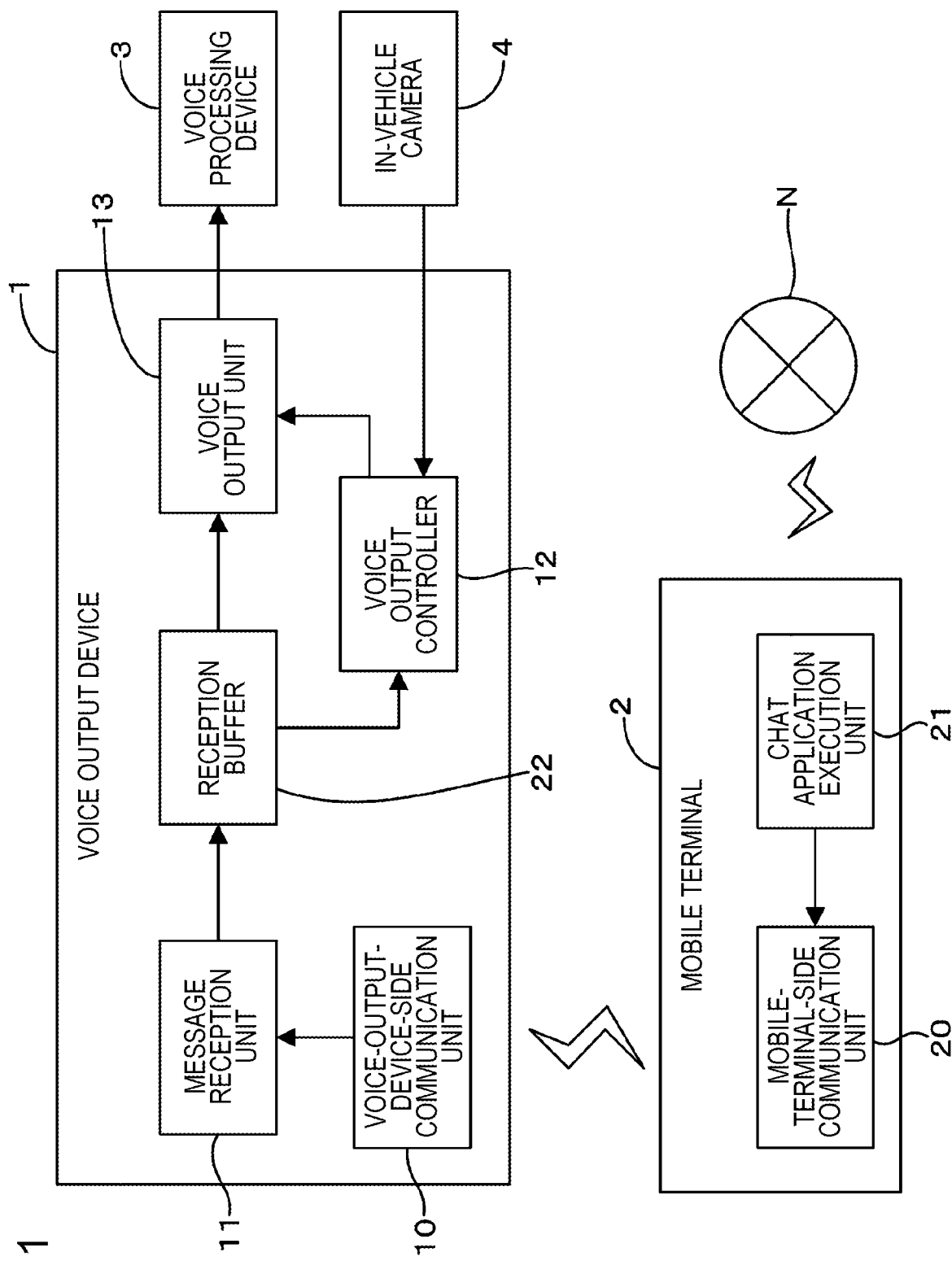
FIG. 1 is a block diagram illustrating functional configurations of a voice output device and a mobile terminal according to a first embodiment of the present disclosure.

Hereinafter, a first embodiment of the present disclosure will be described with reference to the accompanying drawings. FIG. 1 is a block diagram illustrating functional configurations of a voice output device 1 and a mobile terminal 2 connected to the voice output device 1 according to this embodiment. The voice output device 1 is installed in an in-vehicle space formed in a vehicle (that corresponds to a "predetermined space" in the claims), and a so-called car navigation system may function as the voice output device 1, for example. It is assumed in this embodiment that a vehicle in which the voice output device 1 is installed is not an autonomous vehicle but a vehicle basically traveling when a driver drives the vehicle (including a vehicle of autonomous driving of a certain level under a limited environment).

As illustrated in FIG. 1, the voice output device 1 is connected to a voice processing device 3 installed in the in-vehicle space. The voice processing device 3 includes a D/A converter, an amplifier, and a speaker installed in the vehicle, performs D/A conversion on an input voice signal, and amplifies the converted voice signal to be output from the speaker as voice. Furthermore, the voice output device 1 is connected to an in-vehicle camera 4. The in-vehicle camera 4 is an imaging device installed in the in-vehicle space, captures an image of a region including a region of a driver's seat at a predetermined cycle, and outputs captured image data based on a result of the imaging to a voice output controller 12 (described below) of the voice output device 1.

The mobile terminal 2 is a mobile-type terminal carried into the vehicle in which the voice output device 1 is installed by a passenger of the vehicle, and so-called smartphones, cellular phones other than the smartphones, and tablet-type computers that do not have a telephone function may function as the mobile terminal 2, for example. According to this embodiment, for simplicity of description, it is assumed that the mobile terminal 2 is a terminal possessed by the driver. In the mobile terminal 2, an application of a text chat that enables transmission and reception of messages with other persons in a chat format (hereinafter referred to as a "chat application") is installed. The chat application has a function of providing user interfaces associated with the text chat in the mobile terminal 2 and a function of transmitting text data for voice output to the voice output device 1 in response to a reception of message data of a message (this function is described later in detail).

As illustrated in FIG. 1, the voice output device 1 includes a voice-output-device-side communication unit 10, a message reception unit 11, a voice output controller 12, and a voice output unit 13 as a functional configuration. Furthermore, the mobile terminal 2 includes a mobile-terminal-side communication unit 20 and a chat application execution unit 21 as a functional configuration. The functional blocks 10 to 13, 20, and 21 described above may be configured by any of hardware, a digital signal processor (DSP), and software. When the functional blocks 10 to 13, 20, and 21 are configured by software, for example, the functional blocks practically include a central processing unit (CPU), a random access memory (RAM), and a read only memory (ROM) of a computer and are realized when a program stored in the RAM, the ROM, a hard disk, or a recording medium, such as a semiconductor memory, is operated. The same applies to other embodiments described below.

The voice-output-device-side communication unit 10 of the voice output device 1 and the mobile-terminal-side communication unit 20 of the mobile terminal 2 wirelessly communicate with each other in accordance with a predetermined wireless communication standard. Examples of the wireless communication standard include Bluetooth (registered trademark) and communication standards associated with a wireless LAN. Note that the voice output device 1 and the mobile terminal 2 may be connected to each other in a wired manner, and the voice-output-device-side communication unit 10 and the mobile-terminal-side communication unit 20 may communicate with each other in a wired manner in accordance with a predetermined wired communication standard. The chat application execution unit 21 of the mobile terminal 2 executes various processes when hardware, such as a CPU, reads and executes the chat application and programs (including some of the programs of an OS and APIs) associated with the chat application.

The voice output device 1 has a function of outputting, when an operation mode is a message notification mode, voice of information in a message (hereinafter referred to as "message voice") in response to a reception of message data according to the message of a text chat by the mobile terminal 2. A driver (a person intended to receive the message) who possesses the mobile terminal 2 may check the content of the message by listening to the message voice output by the voice output device 1. Note that transition to the message notification mode is performed by an explicit instruction issued by the driver when the power of the voice output device 1 and the power of the mobile terminal 2 are in an ON state. Hereinafter, processes performed by the mobile terminal 2 and the voice output device 1 after the mobile terminal 2 receives the message data in the message notification mode will be described in detail.

The mobile terminal 2 is able to access the network N, including the Internet. The access to the network N may be performed by direct access to a mobile communication network or indirect access to a mobile communication network using a tethering function of a portable router. When another terminal in which the chat application has been installed transmits message data according to the message of the text chat to the mobile terminal 2, the chat application execution unit 21 of the mobile terminal 2 receives the message data. In response to the reception of the message data, the chat application execution unit 21 executes processes based on pre-settings, such as a process of notifying a user of the reception of the message by ring alert and a process of displaying necessary information on a display unit of the mobile terminal 2.

In addition to this process, the chat application execution unit 21 of this embodiment executes a process of generating text data for voice output and transmitting the text data to the mobile terminal 2. The text data for voice output is described by text and includes a message main body included in the message data and supplementary information. As will be apparent below, information described as text in the text data for voice output is finally output as message voice by the voice output device 1. The supplementary information adds items associated with a message to the message main body before the message main body is output by voice. In this embodiment, the supplementary information includes a name of a sender and a date and time of reception of the message data.

It is assumed that the chat application execution unit 21 receives a message main body "Hello" from a sender named "AA" at "13:30, April 1st". In this case, information described as text in text data for voice output is as follows: "13:30, April 1st, from AA, Hello". Note that, when a message main body includes symbols, stamps, or pictographs, the chat application execution unit 21 executes an operation based on a predetermined rule, such as omission or conversion into information represented by text.

The message reception unit 11 of the voice output device 1 receives the text data for voice output transmitted from the chat application execution unit 21 and stores the text data in the reception buffer 22. The reception buffer 22 is a storage region formed in a work area, such as the RAM. The text data for voice output is an object to be received as a message by the message reception unit 11 and corresponds to a "message" in the claims. As a result of the above process performed between the chat application execution unit 21 and the message reception unit 11, the text data for voice output is immediately stored in the reception buffer 22 in response to the reception of the message data by the chat application execution unit 21. Hereinafter, receiving the text data for voice output and storing the text data for voice output in the buffer 22 that are performed by the message reception unit 11 may simply be referred to as "the message reception unit 11 receives a message".

The voice output controller 12 executes a process below when the message reception unit 11 stores the text data for voice output in the reception buffer 22 (that is, when the message reception unit 11 receives a message). Specifically, the voice output controller 12 analyzes captured image data supplied from the in-vehicle camera 4 so as to determine whether a first start condition in which a driver is in an in-vehicle space is satisfied.

Here, while the message notification mode is in an ON state, the driver may not sit on a driver's seat in the in-vehicle space but may move out of the in-vehicle space. For example, the driver moves out of the in-vehicle space to put luggage in a trunk (or take luggage from the trunk) of the vehicle in which the voice output device 1 is installed or moves out of the in-vehicle space for shopping for a short period of time. In these cases, when the driver is out of the in-vehicle space, and therefore, is not in the in-vehicle space (that is, the first start condition is not satisfied), obviously, the driver is unable to normally listen to voice output from the voice output device 1. On the other hand, when the driver is in the in-vehicle space (that is, when the first start condition is satisfied), the driver is able to normally listen to the message voice since the driver is in an area in which the driver is able to receive the message voice output from the voice output device 1. Accordingly, the first start condition is satisfied when the driver (a person intended to receive the message) is able to receive the voice in the in-vehicle space.

The voice output controller 12 determines whether the first start condition is satisfied in the following method. Specifically, when a person sits on the driver's seat, it may be determined that the driver is in the in-vehicle space, but when a person does not sit on the driver's seat, it may be determined that a driver is not in the in-vehicle space. Taking this into consideration, the voice output controller 12 specifies a region of the driver's seat using the input captured image data. The region of the driver's seat in the captured image data is predetermined. Subsequently, the voice output controller 12 determines whether an image of a human face is included in the region of the driver's seat by means of a known face recognition technique. When the voice output controller 12 determines that the image of a human face is included, the voice output controller 12 determines that the first start condition is satisfied, and otherwise, the voice output controller 12 determines that the first start condition is not satisfied.

When the first start condition is satisfied, the voice output controller 12 controls the voice output unit 13 so as to start output of message voice based on the text data for voice output stored in the reception buffer 22. Specifically, the voice output controller 12 outputs a start notification signal to the voice output unit 13. When receiving the start notification signal, the voice output unit 13 generates voice data for outputting, as voice, information described as text in the text data for voice output. The voice data is data of a voice waveform obtained by sampling voice at a predetermined sampling cycle, for example. The generation of the voice data is appropriately executed by means of a voice synthesis technique or other known techniques. Subsequently, the voice output unit 13 outputs a voice signal based on voice data to the voice processing device 3 so that the voice processing device 3 outputs voice based on the voice data (message voice). Consequently, when the first start condition is satisfied, output of the message voice is immediately started in response to the reception of the message performed by the message reception unit 11. Therefore, the driver is able to immediately recognize content of the message in response to the reception of the message.

On the other hand, when the first start condition is not satisfied, the voice output controller 12 suspends output of the message voice to be performed by the voice output unit 13. Specifically, the voice output controller 12 does not output a start notification signal to the voice output unit 13 at that time point. The voice output controller 12 continuously inputs captured image data from the in-vehicle camera 4 so as to monitor whether the first start condition is satisfied by continuously analyzing the captured image data. Specifically, the voice output controller 12 monitors whether the driver has sat on the driver's seat. For example, the voice output controller 12 continuously analyzes captured image data intermittently input so as to determine whether an image of a human face is newly included in the region of the driver's seat. When it is assumed that the driver has sat on the driver's seat, the voice output controller 12 determines that the first start condition is satisfied.

When the first start condition is satisfied, the voice output controller 12 controls the voice output unit 13 so as to start output of the text data for voice output stored in the reception buffer 22. Specifically, the voice output controller 12 outputs a start notification signal to the voice output unit 13.

As described above, when the first start condition is not satisfied at a time point when the message reception unit 11 receives the text data for voice output, the voice output controller 12 suspends output of the message voice to be performed by the voice output unit 13, and thereafter, when the first start condition is satisfied, the voice output controller 12 causes output of the message voice to be performed. Therefore, a situation in which the message voice is output though the driver is not in the in-vehicle space and therefore the driver misses the message voice may be avoided. Specifically, according to this embodiment, the voice output is not immediately performed in response to a reception of a message but is performed only in a state in which the person intended to receive the message is able to normally listen to the message, and the voice output of the message is suspended in other cases. Therefore, the situation in which the person intended to receive the message misses the message is able to be avoided.

Figure 2:
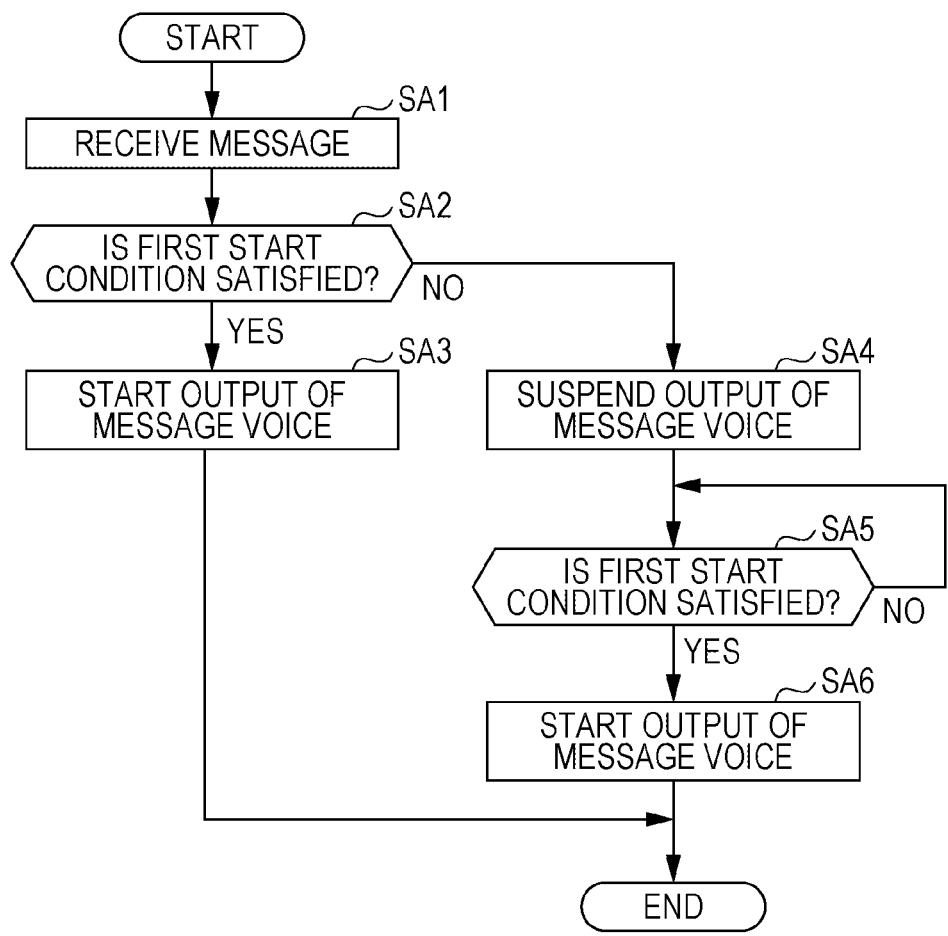
FIG. 2 is a flowchart of an operation of the voice output device according to the first embodiment of the present disclosure.

Next, an example of an operation of the voice output device 1 according to this embodiment will be described with reference to a flowchart. FIG. 2 is a flowchart of an example of an operation performed by the voice output device 1 after text data for voice output is received from the mobile terminal 2. As illustrated in FIG. 2, the message reception unit 11 of the voice output device 1 receives the text data for voice output and stores the text data in the reception buffer 22 (step SA1). When the text data for voice output is stored in the reception buffer 22, the voice output controller 12 determines whether the first start condition is satisfied based on the captured image data of the in-vehicle camera 4 (step SA2). As described above, the first start condition corresponds to a condition in which a person sits on the driver's seat.

When the first start condition is satisfied (step SA2: YES), the voice output controller 12 controls the voice output unit 13 so as to start output of message voice (step SA3). When the first start condition is not satisfied (step SA2: NO), the voice output controller 12 controls the voice output unit 13 so as to suspend output of message voice (step SA4). Subsequently, the voice output controller 12 monitors whether the first start condition is satisfied (step SA5). When the first start condition is satisfied (step SA5: YES), the voice output controller 12 controls the voice output unit 13 so as to start output of message voice (step SA6).

First Modification of First Embodiment

Next, a first modification of the first embodiment will be described. Note that, in the description below, an operation, performed by the voice output controller 12 (or a constituent element corresponding to the voice output controller 12 in the embodiments other than the first embodiment), of causing the voice output unit 13 to start output of message voice may simply be referred to as "the voice output controller 12 starts voice output" where appropriate. Furthermore, an operation, performed by the voice output controller 12, of causing the voice output unit 13 to suspend output of message voice may simply be referred to as "the voice output controller 12 suspends voice output" where appropriate.

In the foregoing first embodiment, a person intended to listen to the message voice is a driver. However, in this modification, person other than the driver is a person intended to listen to the message voice. Hereinafter, a configuration of the voice output device 1 and an example of a process according to this modification will be briefly described. First, an imaging region of the in-vehicle camera 4 is an entire region in the in-vehicle space. Specifically, the in-vehicle camera 4 is disposed in a position where a face of a person may be captured from the front wherever the person sits on a seat in the in-vehicle space. A plurality of in-vehicle cameras 4 may be installed. Furthermore, image data obtained by recording an image of a face of a person intended to listen to the message voice (hereinafter referred to as "face image data") is registered in the voice output device 1 in advance. Note that the person intended to listen to the message voice is basically a possessor of the mobile terminal 2.

Thereafter, when the message reception unit 11 receives a message, the voice output controller 12 determines whether the first start condition in which a person intended to listen to the message voice is in the in-vehicle space is satisfied. Specifically, the voice output controller 12 determines whether an image of a face of the same person as a face indicated by the registered face image data is included in the captured image data supplied from the in-vehicle camera 4. This determination is made based on the known face recognition technique. As a simple example, the voice output controller 12 performs a known multidimensional vector comparison process on a feature vector of an image of the face indicated by the registered face image data and a feature vector of an image of the face included in the captured image data so as to calculate a degree of approximation. When a face image having a degree of approximation equal to or larger than a threshold value is included in the captured image data, the voice output controller 12 determines that an image of the face of the same person as the face of the person indicated by the registered face image data is included in the captured image data. When the image of the face the same as the face indicated by the registered face image data is included in the captured image data, it is determined that the first start condition is satisfied, and otherwise, it is determined that the first start condition is not satisfied.

An operation of the voice output device 1 performed after the determination as to whether the first start condition is satisfied is the same as that of the first embodiment. According to the configuration of the modification, as with the first embodiment, the voice output is not immediately performed in response to a reception of a message but is performed only in a state in which the message is to be normally received by the person intended to listen to the message voice, and the voice output of the message is suspended in other cases. Therefore, missing the listening of the message by the person intended to listen to the message voice may be avoided.

Other Modifications of First Embodiment

Other modifications of the first embodiment will now be described. Although the vehicle in which the voice output device 1 is installed is not an autonomous vehicle in the first embodiment, the vehicle in which the voice output device 1 is installed may be an autonomous vehicle. The voice output controller 12 in the first embodiment analyzes captured image data supplied from the in-vehicle camera 4 so as to determine whether the first start condition is satisfied. Here, the determination as to whether the first start condition is satisfied may be made by another method. As an example, a sensor detecting whether a driver sits on the driver's seat (such as a weight sensor, a switch sensor, or an optical sensor) may be disposed on the driver's seat, and the voice output controller 12 may determine whether the first start condition is satisfied based on a detection value of the sensor.

Second Embodiment

Figure 3:
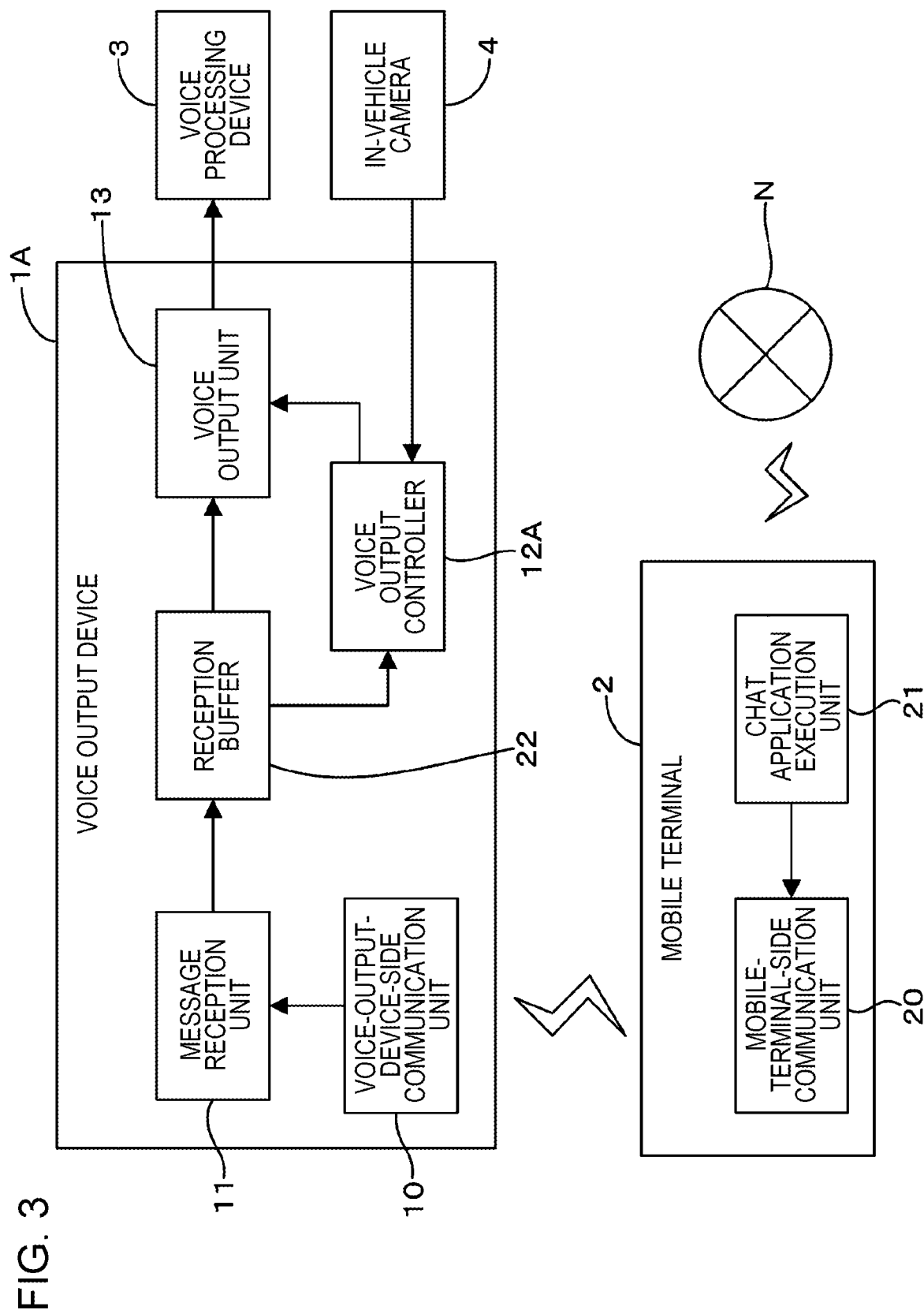
FIG. 3 is a block diagram illustrating functional configurations of a voice output device and a mobile terminal according to a second embodiment of the present disclosure.

Next, a second embodiment will be described. FIG. 3 is a block diagram illustrating a functional configuration of a voice output device 1A according to this embodiment. As is apparent from a comparison between FIGS. 1 and 3, the voice output device 1A according to this embodiment includes a voice output controller 12A instead of the voice output controller 12 according to the first embodiment. Note that it is assumed, as with the first embodiment, that the vehicle in which the voice output device 1A is installed is not an autonomous vehicle and a person intended to listen to the message voice is a driver.

The voice output controller 12A executes the following process when a message reception unit 11 receives a message. Specifically, the voice output controller 12A determines whether the vehicle in which the voice output device 1A is installed is parked. This determination is made by determining whether a hand brake is put on, for example. When the vehicle is not parked, the voice output controller 12A starts voice output without performing a determination as to whether a second start condition described below is satisfied.

On the other hand, when the vehicle in which the voice output device 1A is installed is parked, the voice output controller 12A analyzes captured image data supplied from an in-vehicle camera 4 so as to determine whether the second start condition in which the driver on the driver's seat is not sleeping is satisfied. At a time point when the determination as to whether the second start condition is satisfied is made, it is possible that the vehicle in which the voice output device 1A is installed is parked and the driver is sleeping for rest. When the driver is in a sleeping state (that is, when the second start condition is not satisfied), obviously, the driver is not able to normally listen to voice output from the voice output device 1A. On the other hand, when the driver is not in the sleeping state (that is, when the second start condition is satisfied), the driver stays awake and may receive and recognize the message voice output from the voice output device 1, and therefore, the driver is able to normally listen to the message voice. Accordingly, the second start condition is satisfied when the driver (the person intended to listen to the message voice) may normally listen to voice in the in-vehicle space.

The voice output controller 12A determines whether the second start condition is satisfied based on a known technique. As a simple example, the voice output controller 12A specifies an image of a human face in a region of the driver's seat based on a known face recognition technique in the input captured image data and regards the specified face image as an image of a face of the driver. Then the voice output controller 12A analyzes the specified face image so as to determine whether the driver is in a sleeping state. For example, the voice output controller 12A continuously analyzes captured image data for a certain period (5 seconds, for example) so as to determine whether a state in which eyes are closed is continued for a certain period of time or more. When the state in which the eyes are closed is continued for the certain period of time or more, the voice output controller 12A determines that the driver is in the sleeping state and the second start condition is not satisfied, and otherwise, the voice output controller 12A determines that the second start condition is satisfied.

When the second start condition is satisfied, the voice output controller 12A starts voice output. On the other hand, when the second start condition is not satisfied, the voice output controller 12A suspends voice output. Then the voice output controller 12A continuously analyzes captured image data supplied from the in-vehicle camera 4 so as to monitor whether the second start condition is satisfied. Specifically, the voice output controller 12A monitors whether the driver is in a state other than the sleeping state (in a state in which the driver stays awake). When the second start condition is satisfied, the voice output controller 12A starts voice output.

As described above, the voice output controller 12A suspends voice output when the second start condition is not satisfied at a time point when the message reception unit 11 receives the message, and thereafter, starts voice output when the second start condition is satisfied. Therefore, a situation in which the message voice is output when the driver is in the sleeping state, and therefore the driver will miss the message voice, may be avoided. Specifically, according to this embodiment, the voice output is not immediately performed in response to a reception of a message but is performed only in a state in which the message is to be normally received by the person intended to listen to the message voice and the voice output of the message is suspended in other cases. Therefore, the situation in which the person intended to listen to the message voice misses the message may be avoided.

Figure 4:
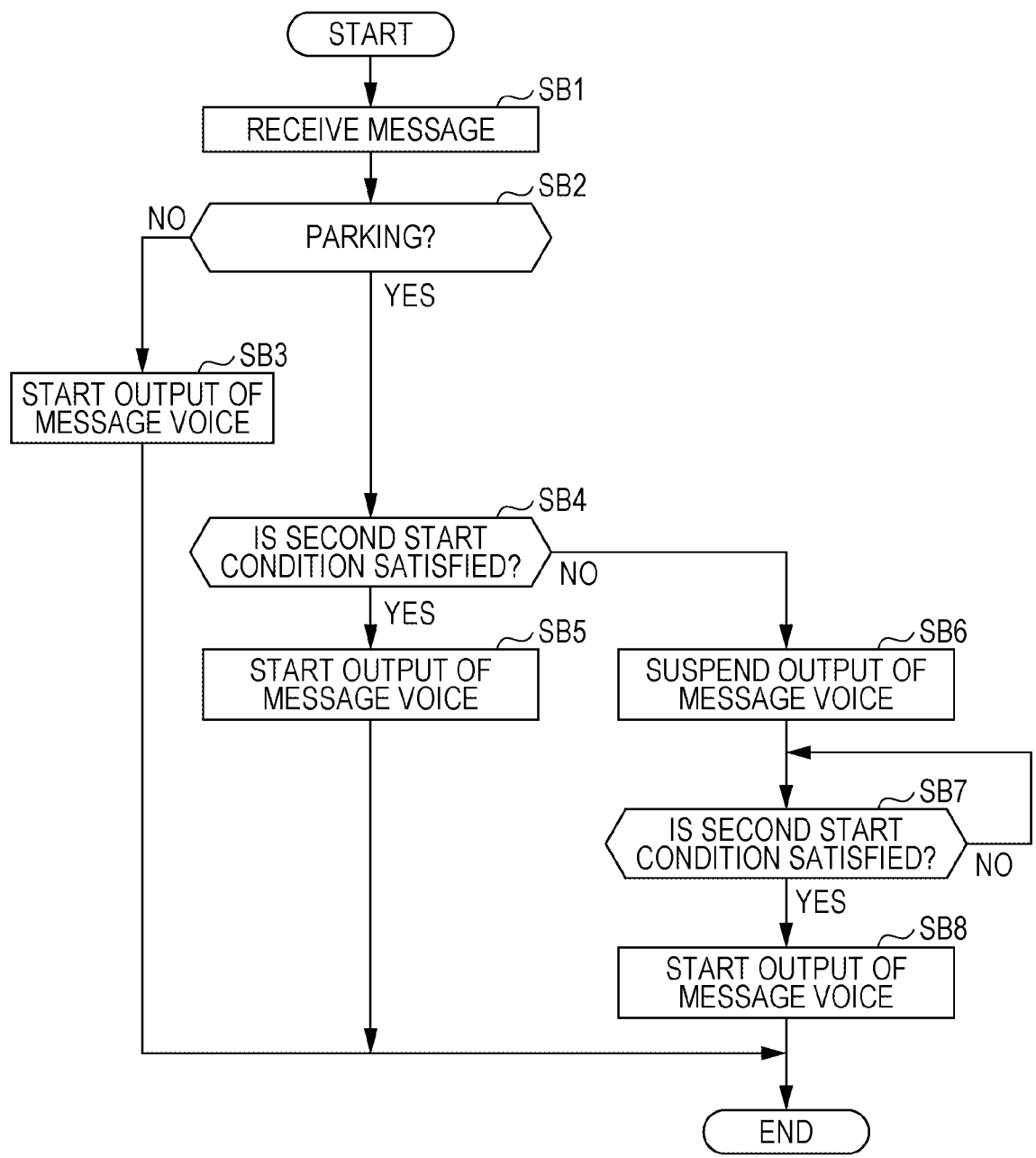
FIG. 4 is a flowchart of an operation of the voice output device according to the second embodiment of the present disclosure.

Next, an example of an operation of the voice output device 1A according to this embodiment will be described with reference to a flowchart. FIG. 4 is a flowchart of an operation performed by the voice output device 1A after text data for voice output is received from the mobile terminal 2. As illustrated in FIG. 4, the message reception unit 11 of the voice output device 1A receives text data for voice output and stores the text data in the reception buffer 22 (step SB1). When the text data for voice output is stored in the reception buffer 22, the voice output controller 12A determines whether the vehicle in which the voice output device 1A is installed is parked (step SB2). When the vehicle is not parked (step SB2: NO), the voice output controller 12A controls the voice output unit 13 so as to start output of message voice (step SB3). After the process in step SB3, the flowchart is terminated. On the other hand, when the vehicle is parked (step SB2: YES), the voice output controller 12A determines whether the second start condition is satisfied based on captured image data supplied from the in-vehicle camera 4 (step SB4). As described above, the second start condition corresponds to a condition in which a driver is not in a sleeping state.

When the second start condition is satisfied (step SB4: YES), the voice output controller 12A controls the voice output unit 13 so as to start output of message voice (step SB5). When the second start condition is not satisfied (step SB4: NO), the voice output controller 12A suspends output of message voice to be performed by the voice output unit 13 (step SB6). Subsequently, the voice output controller 12A monitors whether the second start condition is satisfied (step SB7). When the second start condition is satisfied (step SB7: YES), the voice output controller 12A controls the voice output unit 13 so as to start voice output of the message voice (step SB8).

First Modification of Second Embodiment

Next, a first modification of the second embodiment will be described. In this modification, the vehicle in which the voice output device 1A is installed is an autonomous vehicle having a fully-autonomous function. Note that it is assumed that the physical, technical, or legal environment is ready for fully-autonomous driving and the vehicle in which the voice output device 1A is installed is able to perform fully-autonomous driving on a public road. The driver may sleep in the fully-autonomous driving.

When the message reception unit 11 receives a message during fully-autonomous driving of the vehicle in which the voice output device 1A is installed, the voice output controller 12A of this modification determines whether the second start condition is satisfied without determining whether the vehicle is parked. This is because it is possible that the driver may be sleeping not only during parking of the vehicle but also during fully-autonomous driving of the vehicle. An operation of the voice output device 1A after the determination is the same as that of the second embodiment. According to this modification, a situation in which the driver misses message voice during the fully-autonomous driving of the vehicle in which the voice output device 1A is installed since the driver is sleeping may be avoided.

Other Modifications of Second Embodiment

Other modifications of the second embodiment will now be described. When the message reception unit 11 receives a message, in the second embodiment, the voice output controller 12A may immediately start voice output only when both the first start condition and the second start condition are satisfied and suspend voice output in other cases. Furthermore, although the driver is a person intended to listen to the message voice in the second embodiment, the person intended to listen to the message voice is not limited to the driver. When a person other than the driver is determined as a person intended to listen to the message voice, the voice output controller 12A may determine whether the person intended to listen to the message voice who is not a driver is in a sleeping state based on captured image data supplied from the in-vehicle camera 4 using the technique of the first modification of the first embodiment. Furthermore, in the second embodiment, the voice output controller 12A analyzes captured image data supplied from the in-vehicle camera 4 so as to determine whether the second start condition is satisfied. However, the determination as to whether the second start condition is satisfied may be made by another method. For example, the voice output controller 12A may obtain biological information (such as pulse waves or brain waves) of the driver, determine whether the driver is in a sleeping state based on the biological information, and determine whether the second start condition is satisfied based on the determination.

Third Embodiment

Figure 5:
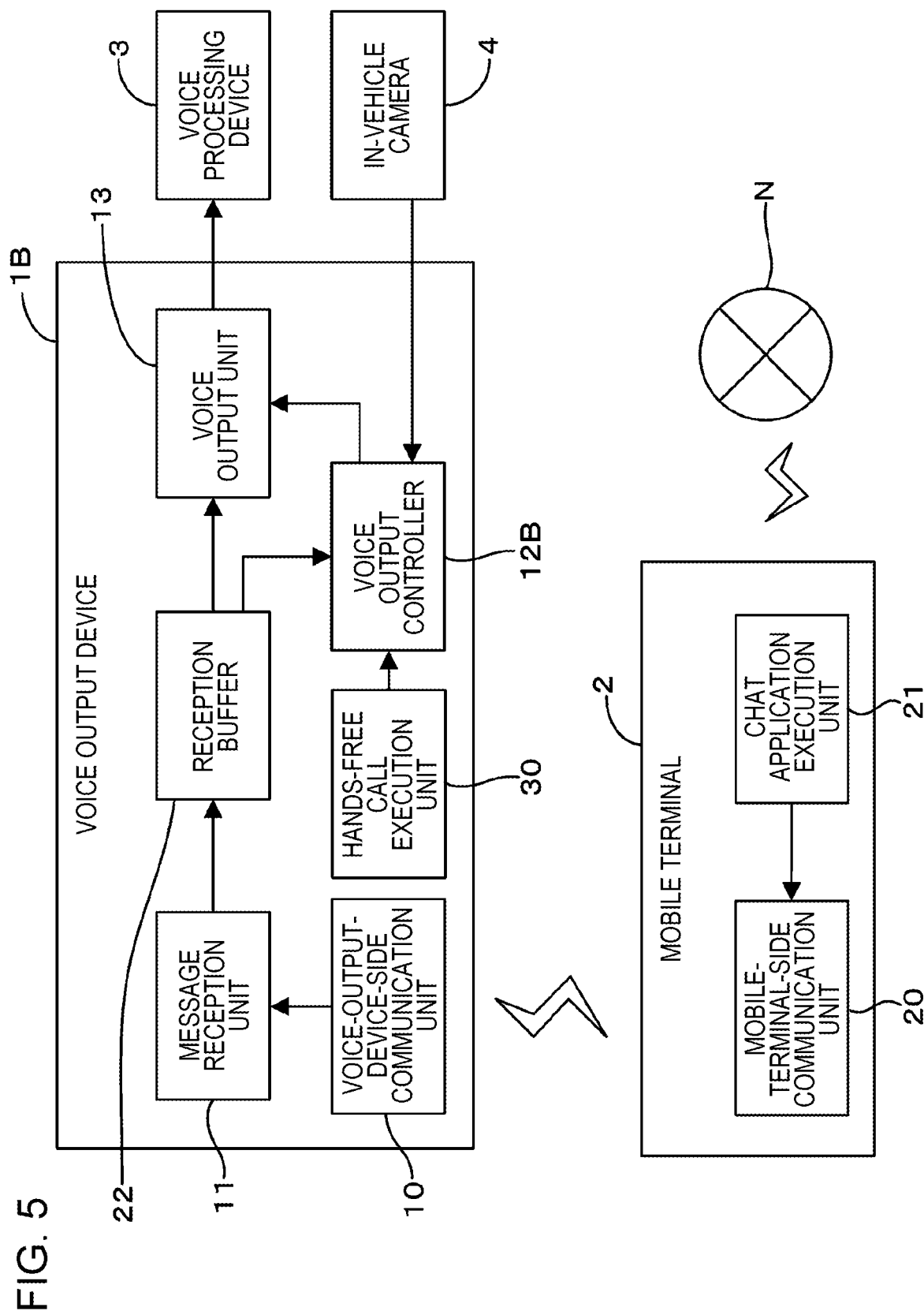
FIG. 5 is a block diagram illustrating functional configurations of a voice output device and a mobile terminal according to a third embodiment of the present disclosure.

Next, a third embodiment will be described. FIG. 5 is a block diagram illustrating a functional configuration of a voice output device 1B according to this embodiment. In this embodiment, a vehicle in which the voice output device 1B is installed is not an autonomous vehicle. Furthermore, in this embodiment, a person intended to listen to message voice is a driver, and a person who performs a hands-free call described below is also a driver. As is apparent from a comparison between FIGS. 1 and 5, the voice output device 1B according to this embodiment includes a voice output controller 12B instead of the voice output controller 12 according to the first embodiment. Furthermore, the voice output device 1B of this embodiment includes a hands-free call execution unit 30. The hands-free call execution unit 30 is a functional block that realizes a hands-free call in cooperation with a mobile terminal 2. An apparatus required for realizing the hands-free call (such as a microphone for inputting speech voice) is appropriately installed. The hands-free call execution unit 30 outputs a signal indicating that a hands-free call is being performed to the voice output controller 12B during the hands-free call.

The voice output controller 12B executes the following process when a message reception unit 11 receives a message. Specifically, the voice output controller 12B determines whether a third start condition in which the driver is not making a phone call is satisfied. Note that, in this embodiment, the driver may make a hands-free call during driving of the vehicle in which the voice output device 1B is installed (the hands-free call may obviously be performed while driving is not performed) or may make a phone call using the mobile terminal 2 of the driver or using another device having a telephone function during parking of the vehicle. Note that, in this embodiment, the mobile terminal 2 may be used as a telephone while maintaining a message notification mode as an operation mode.

Here, when the driver is making a phone call (that is, when the third start condition is not satisfied), the driver is not able to concentrate on listening to voice output from the voice output device 1B. On the other hand, when the driver is not making a phone call (that is, when the third start condition is satisfied), the driver is able to normally listen to the message voice since the driver may concentrate on listening to the message voice without being disturbed by a telephone call. Accordingly, the third start condition is satisfied when the driver (the person intended to listen to the message voice) may normally listen to voice in the in-vehicle space.

The voice output controller 12B determines whether the third start condition is satisfied in the following method. Specifically, the voice output controller 12B determines that the driver is making a hands-free call (making a phone call) and the third start condition is not satisfied when receiving a signal indicating that a hands-free call is being performed from the hands-free call execution unit 30 at a time when the message reception unit 11 receives a message. Furthermore, the voice output controller 12B analyzes captured image data supplied from the in-vehicle camera 4 so as to determine whether the driver is making a phone call. Here, when the driver is making a phone call, obviously, the driver acts uniquely to a situation of making a phone call, for example, puts a mobile phone on an ear, or moves a mouth for conversation while wearing a headset. Therefore, the voice output controller 12B analyzes the captured image data by an image analysis technique using a pattern image corresponding to the unique action in the telephone call so as to determine whether the driver is making a phone call. The voice output controller 12B determines that the third start condition is not satisfied when determining, as a result of the analysis of the captured image data, that the driver is making a phone call. The voice output controller 12B determines that the third start condition is satisfied when the voice output controller 12B does not determine that the third start condition is not satisfied from the two points of view described above.

When the third start condition is satisfied, the voice output controller 12B starts voice output. On the other hand, when the third start condition is not satisfied, the voice output controller 12B suspends voice output and monitors whether the third start condition is satisfied. Specifically, the voice output controller 12B monitors whether the driver is in a state in which the driver is not making a phone call. When the third start condition is satisfied, the voice output controller 12B starts voice output.

As described above, the voice output controller 12B suspends voice output when the third start condition is not satisfied at a time when the message reception unit 11 receives the message, and thereafter, starts voice output when the third start condition is satisfied. With this configuration, a situation in which the message voice is output when the driver is making a phone call, and therefore the driver misses the message voice since the driver is not able to concentrate on listening to the message voice, may be avoided. Specifically, according to this embodiment, the voice output is not immediately performed in response to a reception of a message but is performed only in a state in which the message is to be normally received by the person intended to listen to the message voice, and the voice output of the message is suspended in other cases. Therefore, the situation in which the person intended to listen to the message voice misses the message may be avoided.

Figure 6:
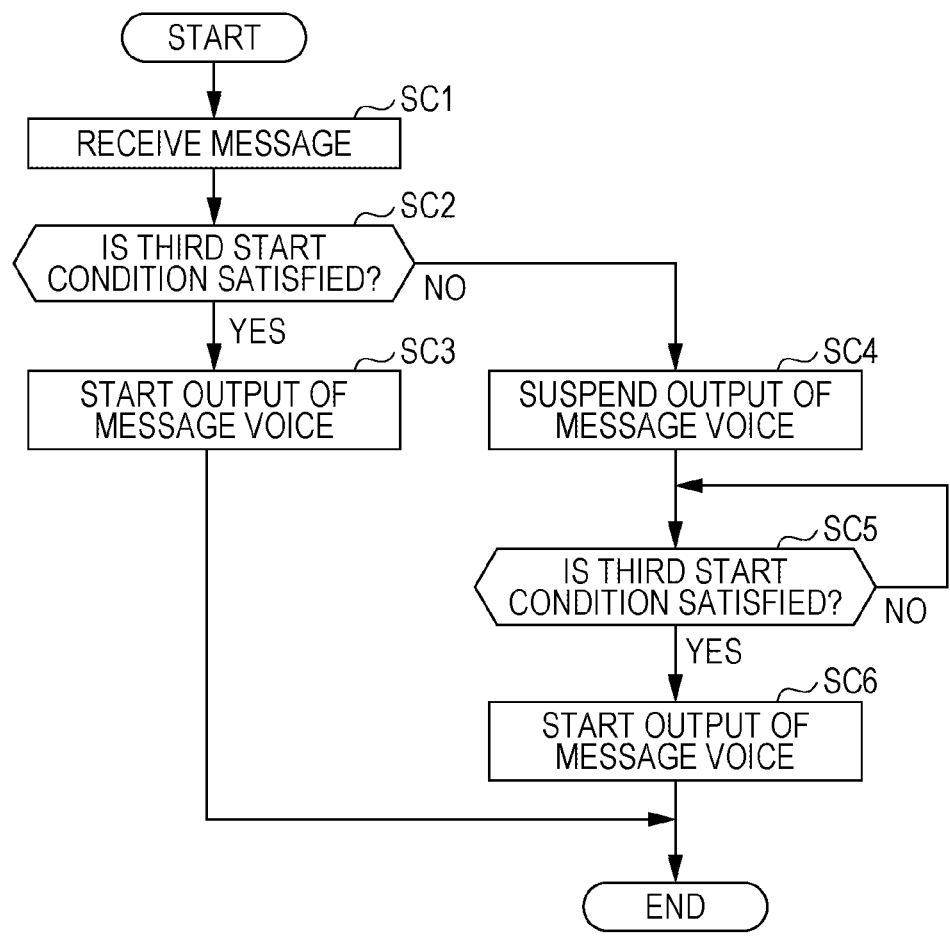
FIG. 6 is a flowchart of an operation of the voice output device according to the third embodiment of the present disclosure.

Next, an example of an operation of the voice output device 1B according to this embodiment will be described with reference to a flowchart. FIG. 6 is a flowchart of an operation performed by the voice output device 1B after text data for voice output is received from the mobile terminal 2. As illustrated in FIG. 6, the message reception unit 11 of the voice output device 1B receives text data for voice output and stores the text data in a reception buffer 22 (step SC1). When the text data for voice output is stored in the reception buffer 22, the voice output controller 12B determines whether the third start condition is satisfied based on an input by the hands-free call execution unit 30 and captured image data supplied from the in-vehicle camera 4 (step SC2). As described above, the third start condition corresponds to a condition in which a driver is not making a phone call.

When the third start condition is satisfied (step SC2: YES), the voice output controller 12B controls the voice output unit 13 so as to start output of message voice (step SC3). When the third start condition is not satisfied (step SC2: NO), the voice output controller 12B suspends output of message voice performed by the voice output unit 13 (step SC4). Subsequently, the voice output controller 12B monitors whether the third start condition is satisfied (step SC5). When the third start condition is satisfied (step SC5: YES), the voice output controller 12B controls the voice output unit 13 so as to start output of message voice (step SC6).

Modification of Third Embodiment

Next, a modification of the third embodiment will be described. Although the vehicle in which the voice output device 1B is installed is not an autonomous vehicle in the third embodiment, obviously the vehicle may be an autonomous vehicle. Furthermore, in the third embodiment, when the message reception unit 11 receives a message, the voice output controller 12B may immediately start voice output only when the third start condition and any combination of the first and second start conditions (the combination includes one condition or two conditions) are satisfied and suspend voice output in other cases. Furthermore, although the driver is a person intended to listen to the message voice in the third embodiment, the person intended to listen to the message voice is not limited to the driver. When a person other than the driver is determined as the person intended to listen to the message voice, the voice output controller 12B may determine whether the person intended to listen to the message voice who is not a driver is making a phone call based on captured image data supplied from the in-vehicle camera 4 using the technique of the first modification of the first embodiment. Furthermore, the determination as to whether the driver is making a phone call may be made in a method other than the method described in the third embodiment.

Fourth Embodiment

Figure 7:
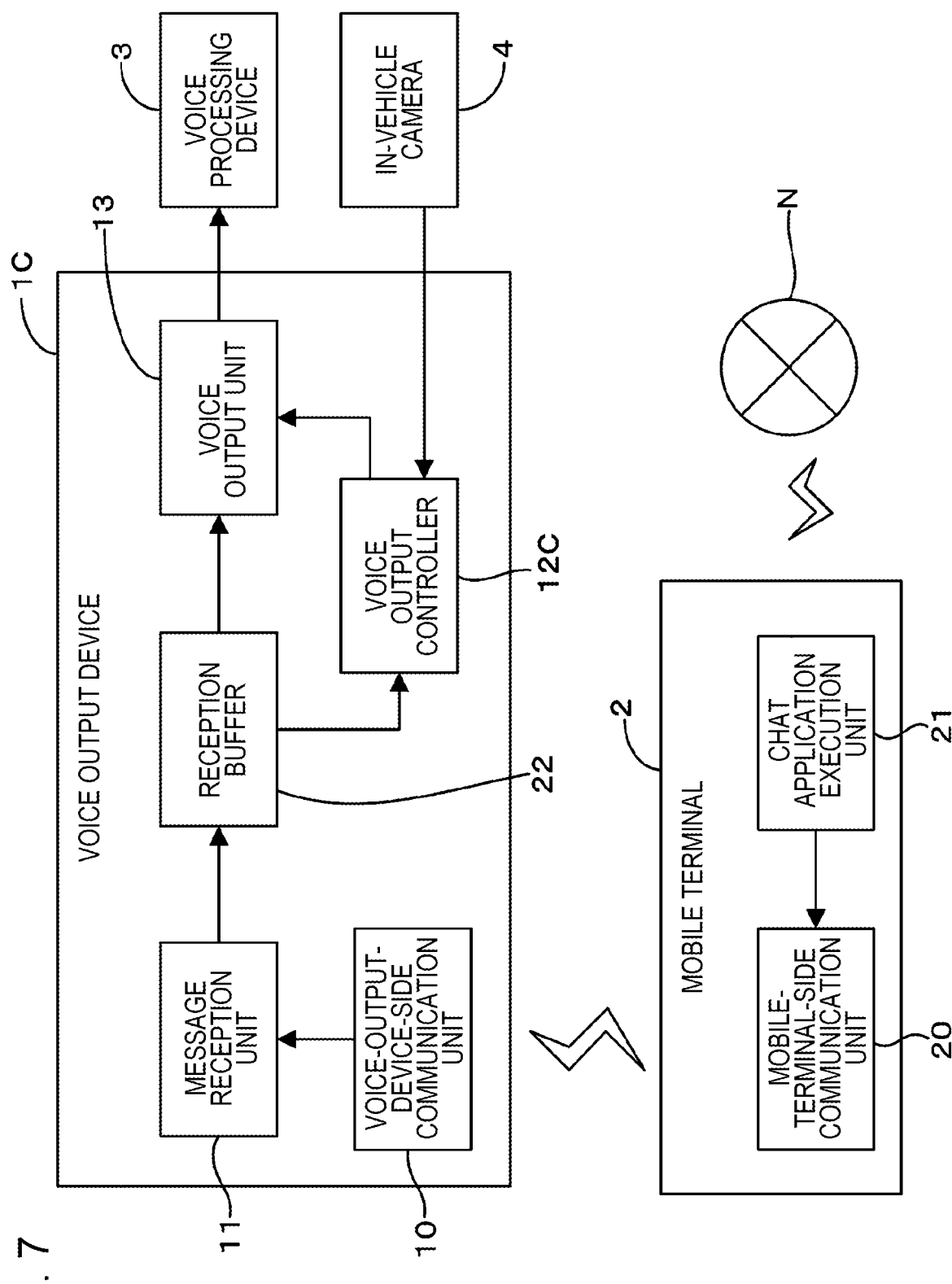
FIG. 7 is a block diagram illustrating functional configurations of a voice output device and a mobile terminal according to a fourth embodiment of the present disclosure.

Next, a fourth embodiment will be described. FIG. 7 is a block diagram illustrating a functional configuration of a voice output device 1C according to this embodiment. Note that it is assumed that a person intended to listen to listen to message voice is a driver, and a vehicle in which the voice output device 1C is installed is not an autonomous vehicle. As is apparent from a comparison between FIGS. 1 and 7, the voice output device 1C according to this embodiment includes a voice output controller 12C instead of the voice output controller 12 according to the first embodiment.

The voice output controller 12C executes the following process when the message reception unit 11 receives a message. Specifically, the voice output controller 12C determines whether a fourth start condition in which the driver is not having a conversation is satisfied. When the driver is having a conversation, a passenger other than the driver is in the vehicle in which the voice output device 1C is installed and the driver is talking to the passenger. When the driver is having a conversation (that is, when the fourth start condition is not satisfied), the driver is not able to concentrate on listening to voice output from the voice output device 1C. On the other hand, when the driver is not having a conversation (that is, when the fourth start condition is satisfied), the driver may normally listen to message voice since the driver is able to concentrate on listening to the message voice without being disturbed by the conversation. Accordingly, the fourth start condition is satisfied when the driver (the person intended to listen to the message voice) may normally listen to voice in the in-vehicle space.

The voice output controller 12C determines whether the fourth start condition is satisfied in the following method. Specifically, the voice output controller 12C specifies an image of a face of the driver in captured image data supplied from the in-vehicle camera 4 by the method described in the first embodiment. Subsequently, the voice output controller 12C specifies a region of a mouth in the face image, traces the region of the mouth for a predetermined period (five seconds, for example), and analyzes the region. When the mouth is not continuously moved for a predetermined period of time (in a state in which the mouth is closed or in a state in which the mouth is opened), the voice output controller 12C determines, based on a result of the analysis of the mouth region, that the driver is not having a conversation and the fourth start condition is satisfied, and otherwise, the voice output controller 12C determines that the driver is having a conversation and the fourth start condition is not satisfied.

When the fourth start condition is satisfied, the voice output controller 12C starts voice output. On the other hand, when the fourth start condition is not satisfied, the voice output controller 12C suspends the voice output and monitors whether the fourth start condition is satisfied. Specifically, the voice output controller 12C monitors whether the driver is in a state of having no conversation. For example, the voice output controller 12C continuously monitors a movement of a mouth of the driver by continuously analyzing captured image data, and determines that the fourth start condition is satisfied when recognizing a state in which the mouth is not continuously moved for a predetermined period of time or more. When the fourth start condition is satisfied, the voice output controller 12C starts voice output.

As described above, the voice output controller 12C suspends voice output when the fourth start condition is not satisfied at a time point when the message reception unit 11 receives the message, and thereafter, starts voice output when the fourth start condition is satisfied. With this configuration, a situation in which the message voice is output when the driver is having a conversation, and therefore the driver miss the message voice since the driver is not able to concentrate on listening to the message voice, may be avoided. Specifically, according to this embodiment, the voice output is not immediately performed in response to a reception of a message but is performed only in a state in which the message is to be normally received by the person intended to listen to the message voice, and the voice output of the message is suspended in other cases. Therefore, the situation in which the person intended to listen to the message voice misses the message may be avoided.

Figure 8:
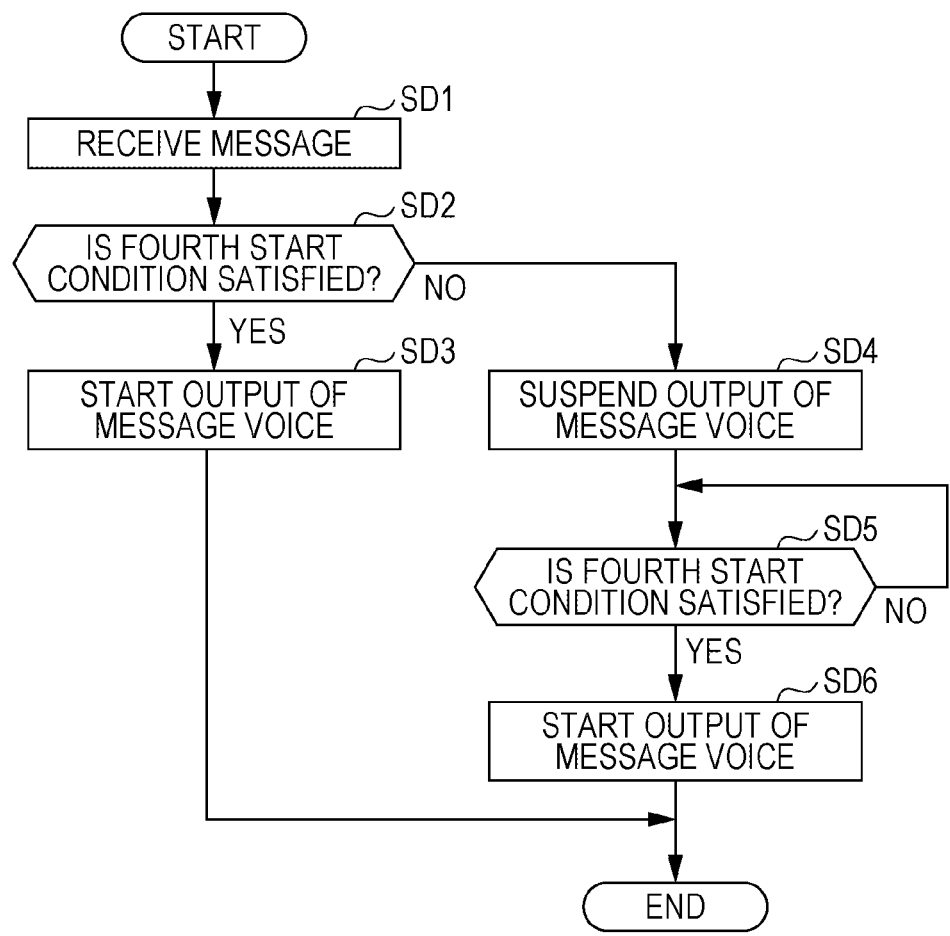
FIG. 8 is a flowchart of an operation of the voice output device according to the fourth embodiment of the present disclosure.

Next, an operation of the voice output device 1C according to this embodiment will be described with reference to a flowchart. FIG. 8 is a flowchart of an operation performed by the voice output device 1C after the text data for voice output is received from the mobile terminal 2. As illustrated in FIG. 8, a message reception unit 11 of the voice output device 1C receives text data for voice output and stores the text data in a reception buffer 22 (step SD1). When the text data for voice output is stored in the reception buffer 22, the voice output controller 12C determines whether the fourth start condition is satisfied based on captured image data supplied from the in-vehicle camera 4 (step SD2). As described above, the fourth start condition corresponds to a condition in which a driver is not having a conversation.

When the fourth start condition is satisfied (step SD2: YES), the voice output controller 12C controls the voice output unit 13 so as to start output of message voice (step SD3). When the fourth start condition is not satisfied (step SD2: NO), the voice output controller 12C suspends output of message voice performed by the voice output unit 13 (step SD4). Subsequently, the voice output controller 12C monitors whether the fourth start condition is satisfied (step SD5). When the fourth start condition is satisfied (step SD5: YES), the voice output controller 12C controls the voice output unit 13 so as to start output of message voice (step SD6).

First Modification of Fourth Embodiment

Next, a first modification of the fourth embodiment will be described. Specifically, the voice output controller 12C determines whether the fourth start condition in which the driver is not having a conversation is satisfied in the fourth embodiment described above. The voice output controller 12C according to this modification determines whether the fourth start condition in which the driver is not having a conversation in a loud voice is satisfied. Specifically, a microphone for receiving speech voice of the driver is connected to the voice output device 1C, and a sound pressure level of voice input to the microphone is supplied to the voice output controller 12C from a voice processing circuit that processes input from the microphone.

Thereafter, when the message reception unit 11 receives a message, the voice output controller 12C determines whether the fourth start condition in which the driver is not having a conversation in a loud voice is satisfied. Specifically, when the driver is having a conversation (a determination as to whether the driver is having a conversation is made by the method described in the fourth embodiment) and when an input sound pressure level is equal to or larger than a threshold value, the voice output controller 12C determines that the fourth start condition is not satisfied, and otherwise, the voice output controller 12C determines that the fourth start condition is satisfied. Note that when the driver is having a conversation and when a sound pressure level of voice input to the microphone is equal to or larger than the threshold value, it may be determined that the driver is having a conversation in a voice equal to or larger than a certain level.

Here, when the driver is having a conversation in a small voice, a degree of concentration on the conversation is smaller than a case where the driver is having a conversation in a loud voice, and therefore, it may be determined that the driver may listen to the output message voice without missing the message voice or it is highly possible that the driver may listen to the message voice without missing the message voice. Therefore, according to this modification, when the driver is having a conversation in a small voice, the message voice is immediately output in response to a reception of a message, and therefore, uncomfortable feeling that the driver may have when output of the message voice is suspended even though the driver is available for listening to the message voice may be avoided.

Other Modifications of Fourth Embodiment

Next, a modification of the fourth embodiment will be described. In the fourth embodiment, when the message reception unit 11 receives a message, the voice output controller 12C may immediately start voice output only when the fourth start condition and any combination of the first to third second start conditions (the combination includes one condition, two conditions, and three conditions) are satisfied and suspend voice output in other cases. In this case, content of the fourth start condition may be determined as content of the fourth start condition according to the first modification of the fourth embodiment. Furthermore, although the vehicle in which the voice output device 1C is installed is not an autonomous vehicle in the fourth embodiment, obviously the vehicle may be an autonomous vehicle. Moreover, although the driver is a person intended to listen to the message voice in the fourth embodiment, the person intended to listen to the message voice is not limited to the driver. Here, the voice output controller 12C may determine whether the person intended to listen to the message voice who is not a driver is having a conversation based on captured image data supplied from the in-vehicle camera 4 using the technique of the first modification of the first embodiment. Furthermore, a method for determining whether the driver is having a conversation is not limited to the method illustrated in the fourth embodiment, and any method applying a known technique may be employed.

Fifth Embodiment

Figure 9:
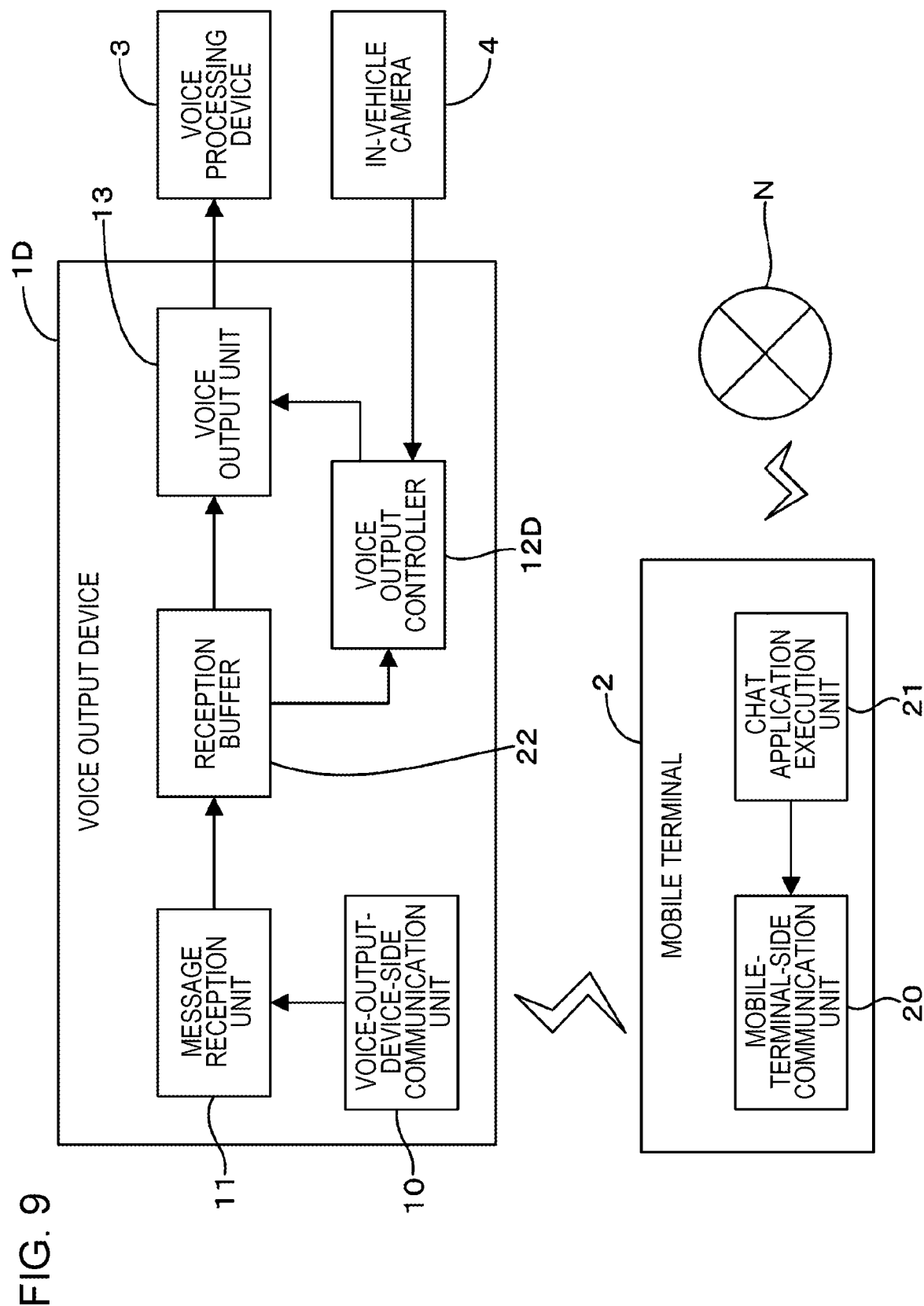
FIG. 9 is a block diagram illustrating functional configurations of a voice output device and a mobile terminal according to a fifth embodiment of the present disclosure.

Next, a fifth embodiment will be described. FIG. 9 is a block diagram illustrating a functional configuration of a voice output device 1D according to this embodiment. Note that it is assumed that a person intended to listen to message voice is a driver, and a vehicle in which the voice output device 1D is installed is not an autonomous vehicle. As is apparent from a comparison between FIGS. 1 and 9, the voice output device 1D according to this embodiment includes a voice output controller 12D instead of the voice output controller 12 according to the first embodiment. The voice output controller 12D executes the following process when the message reception unit 11 receives a message. Specifically, the voice output controller 12D determines whether a fifth start condition in which the driver is relaxing is satisfied. When the driver is not relaxing (that is, when the fifth start condition is not satisfied), the driver may not concentrate on listening to voice output from the voice output device 1D. On the other hand, when the driver is relaxing (that is, when the fifth start condition is satisfied), the driver is able to concentrate on listening to the message voice output from the voice output device 1D in the relaxing state, and therefore the driver may normally listen to the message voice. Accordingly, the fifth start condition is satisfied when the driver (the person intended to listen to the message voice) may normally listen to voice in the in-vehicle space.

The voice output controller 12D determines whether the fifth start condition is satisfied in the following method. Specifically, the voice output controller 12D specifies an image of a face of the driver in captured image data supplied from the in-vehicle camera 4 by the method described in the first embodiment and determines whether the driver is relaxing based on a known face expression recognition technique. When the driver is relaxing, the voice output controller 12D determines that the fifth start condition is satisfied, and otherwise, the voice output controller 12D determines that the fifth start condition is not satisfied. Note that, in this embodiment, since the driver drives the vehicle in which the voice output device 1D is installed, the driver sometimes concentrates on the driving, and therefore, in this case, it is expected to be determined that the fifth start condition is not satisfied. Therefore, various parameters of a module that performs face expression recognition based on the face expression recognition technique are appropriately controlled such that it may be determined that the driver is not in a relaxing state when concentrating on the driving.

When the fifth start condition is satisfied, the voice output controller 12D starts voice output. On the other hand, when the fifth start condition is not satisfied, the voice output controller 12D suspends voice output and monitors whether the fifth start condition is satisfied. Specifically, the voice output controller 12D monitors whether the driver is in a relaxing state. When the fifth start condition is satisfied, the voice output controller 12D starts voice output.

As described above, the voice output controller 12D suspends voice output when the fifth start condition is not satisfied at a time point when the message reception unit 11 receives the message, and thereafter, starts voice output when the fifth start condition is satisfied. With this configuration, a situation in which the message voice is output when the driver is not relaxing, and therefore the driver is not able to concentrate on listening to the message voice and miss the message voice, may be avoided. Specifically, according to this embodiment, the voice output is not immediately performed in response to a reception of a message but is performed only in a state in which the message is to be properly received by the person intended to listen to the message voice, and voice output of the message is suspended in other cases. Therefore, the situation in which the person intended to listen to the message voice misses the message may be avoided.

Figure 10:
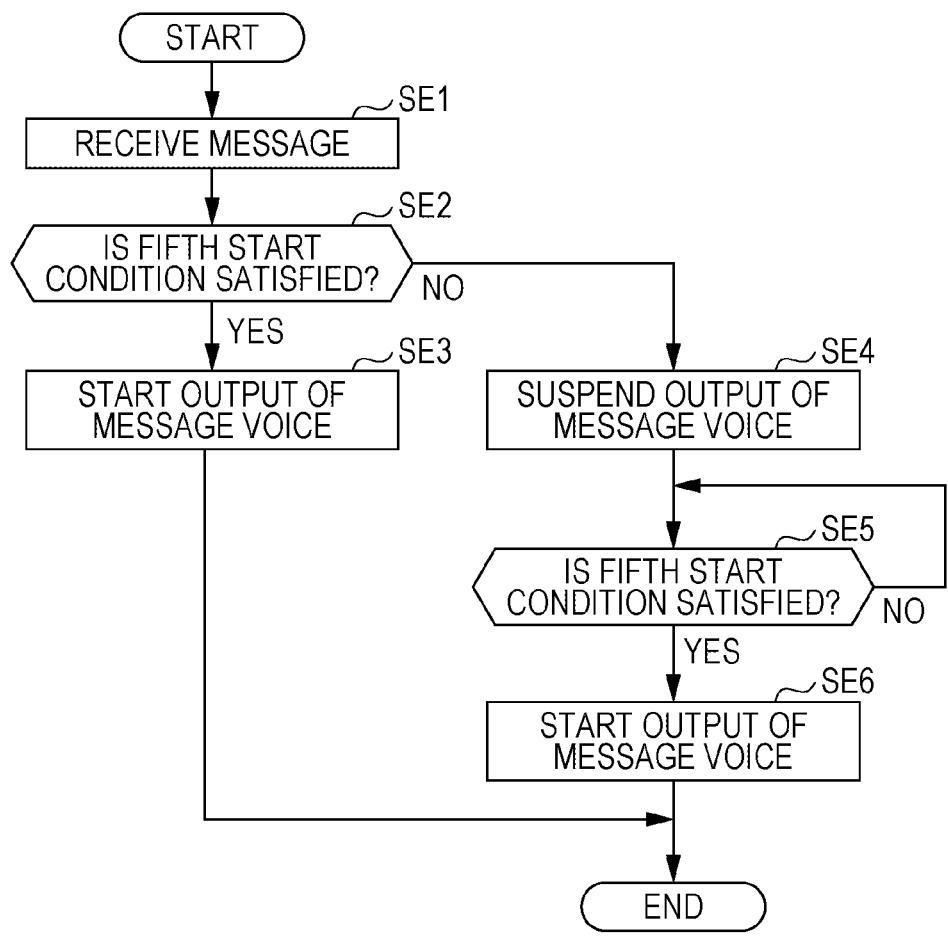
FIG. 10 is a flowchart of an operation of the voice output device according to the fifth embodiment of the present disclosure.

Next, an example of an operation of the voice output device 1D according to this embodiment will be described with reference to a flowchart. FIG. 10 is a flowchart of an operation performed by the voice output device 1D after text data for voice output is received from the mobile terminal 2. As illustrated in FIG. 10, a message reception unit 11 of the voice output device 1D receives text data for voice output and stores the text data in a reception buffer 22 (step SE1). When the text data for voice output is stored in the reception buffer 22, the voice output controller 12D determines whether the fifth start condition is satisfied based on the captured image data supplied from the in-vehicle camera 4 (step SE2). As described above, the fifth start condition corresponds to a condition in which a driver is relaxing.

When the fifth start condition is satisfied (step SE2: YES), the voice output controller 12D controls the voice output unit 13 so as to start output of message voice (step SE3). When the fifth start condition is not satisfied (step SE2: NO), the voice output controller 12D suspends output of message voice performed by the voice output unit 13 (step SE4). Subsequently, the voice output controller 12D monitors whether the fifth start condition is satisfied (step SE5). When the fifth start condition is satisfied (step SE5: YES), the voice output controller 12D controls the voice output unit 13 so as to start output of message voice (step SE6).

Modification of Fifth Embodiment

Next, a modification of the fifth embodiment will be described. In the fifth embodiment, when the message reception unit 11 receives a message, the voice output controller 12D may immediately start voice output only when the fifth start condition and any combination of the first to fourth start conditions (the combination includes one condition, two conditions, three conditions, and four conditions) are satisfied and suspend voice output in other cases. In this case, content of the fourth start condition may be determined as content of the fourth start condition according to the first modification of the fourth embodiment.

Furthermore, although the vehicle in which the voice output device 1D is installed is not an autonomous vehicle in the fifth embodiment, obviously the vehicle may be an autonomous vehicle. In the case of the autonomous vehicle, when the driver concentrates on reading, for example, voice output of the message voice may be avoided. Moreover, although the driver is a person intended to listens to the message voice in the fifth embodiment, the person intended to listen to the message voice is not limited to the driver. Here, the voice output controller 12D may determine whether the person intended to listen to the message voice who is not a driver is relaxing based on captured image data supplied from the in-vehicle camera 4 using the technique of the first modification of the first embodiment.

Furthermore, a method for determining whether the driver is relaxing is not limited to the method illustrated in the fifth embodiment, and any method applying a known technique may be employed. For example, biological information (pulse waves or brain waves) of the driver may be obtained and a determination as to whether the driver is relaxing may be determined based on the biological information. Alternatively, when the voice output controller 12D recognizes a situation of the vehicle in which the voice output device 1D is installed and when the driver concentrates on driving (or the driver is required to concentrate on driving) taking the situation into consideration, the voice output controller 12D may determine that the driver is not relaxing and the fifth start condition is not satisfied. Examples of the situation of the vehicle in which the voice output device 1D is installed include a situation of a traffic jam, a situation in which the vehicle is about to enter an intersection, a situation in which the vehicle is entering an intersection, a situation in which the vehicle is maneuvering for parking, and a situation in which acceleration and deceleration is frequently repeated.

Although the embodiments (including the modifications) of the present disclosure are described hereinabove, the foregoing embodiments are merely examples embodying the present disclosure.

For example, in the first embodiment, the voice output controller 12 starts voice output when the first start condition "the driver is in the in-vehicle space" is satisfied and suspends voice output when the first start condition is not satisfied. This processing procedure is referred to as a "first processing procedure" hereinafter. Here, a processing procedure of defining a condition corresponding to denial of the first start condition, that is, a condition "the driver is not in the in-vehicle space" and defining that "the voice output controller 12 suspends voice output when the condition is satisfied and starts voice output when the condition is not satisfied" is the same meaning as the first processing procedure. The same applies to the other embodiments (including the modifications).

Furthermore, although a chat application is installed in the mobile terminal 2 in the first embodiment, the chat application may be installed in the voice output device 1, and in addition, a function of access to the network N may be implemented in the voice output device 1 and the message reception unit 11 of the voice output device 1 may directly receive message data associated with a message transmitted from a predetermined terminal. Furthermore, although the chat application execution unit 21 of the mobile terminal 2 generates text data for voice output according to the first embodiment, the message data may be transmitted to the voice output device 1 without generating text data for voice output when the chat application execution unit 21 receives message data. In this configuration, message data to be received by the message reception unit 11 corresponds to a "message" in the claims. In these cases, a configuration in which text data for voice output is generated to be stored in the reception buffer 22 when the message reception unit 11 receives message data is employed, or a configuration in which message data is stored in the reception buffer 22 when the message reception unit 11 receives the message data, the message data is read when the voice output unit 13 receives a start notification signal from the voice output controller 12, and text data for voice output is generated based on the message data may be employed. The same applies to the other embodiments (including the modifications).

Furthermore, in the first embodiment, the voice output controller 12 suspends voice output when the first start condition is not satisfied at a time when the message reception unit 11 receives the message, and thereafter, starts voice output when the first start condition is satisfied. Here, voice output may not be automatically started after voice output is suspended, but voice output may be started when an alert indicating that a message has been received is output and the driver (or a person other than the driver) makes a clear instruction. When the voice output device 1 includes a display unit, for example, predetermined information is displayed as the alert in the display unit, and when an LED is disposed on a housing of the voice output device 1, for example, an LED is turned on or lighting in a predetermined mode as the alert. The same applies to the other embodiments (including the modifications).

Furthermore, in the foregoing embodiments, the space in which the voice output device 1 is installed is the in-vehicle space, and the in-vehicle space corresponds to a predetermined space in the claims. However, the space in which the voice output device 1 is installed and a person listens to message voice is not limited to the in-vehicle apparatus. Examples of the space include a room of a house and a room of an office. The same applies to the other embodiments (including the modifications).

Furthermore, in the first embodiment, all or some of processes to be executed by the functional blocks of the voice output device 1 may be executed by an external apparatus connected to the voice output device 1. The external device may be the mobile terminal 2, for example, or a cloud server connected to the network N, for example. In this case, the voice output device 1 and the external apparatus cooperate with each other as a "voice output device". The same applies to the other embodiments (including the modifications).

Although messages are exchanged in a text chat in the foregoing embodiments, messages are not limited to these and the messages may be e-mails.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A voice output device disposed in a predetermined space, the voice output device comprising:
   a voice output unit configured to output voice through a speaker,
      a message reception unit configured to receive a message; and
      a voice output controller configured to provide voice output of the message and to determine, when the message reception unit receives the message, whether a start condition of when a person intended to receive voice output of the message normally is able to listen to voice in the predetermined space is satisfied, and cause the voice output unit to start voice output of the message when the start condition is satisfied and suspend voice output of the message when the start condition is not satisfied.

2. The voice output device according to claim 1, wherein the voice output controller monitors whether the start condition is satisfied after causing the voice output unit to suspend voice output of the message, and causes the voice output unit to start voice output of the message when the start condition is satisfied.

3. The voice output device according to claim 1, wherein the voice output controller determines whether a condition in which the person intended to receive the message is in the predetermined space is satisfied to determine whether the start condition is satisfied.

4. The voice output device according to claim 3, wherein the voice output controller monitors whether the start condition is satisfied after causing the voice output unit to suspend voice output of the message, and causes the voice output unit to start voice output of the message when the start condition is satisfied.

5. The voice output device according to claim 1, wherein the voice output controller determines whether a condition in which the person intended to receive the message is not making a phone call is satisfied to determine whether the start condition is satisfied.

6. The voice output device according to claim 5, wherein the voice output controller monitors whether the start condition is satisfied after causing the voice output unit to suspend voice output of the message, and causes the voice output unit to start voice output of the message when the start condition is satisfied.

7. The voice output device according to claim 1, wherein the voice output controller determines whether a condition in which the person intended to receive the message is not having a conversation is satisfied to determine whether the start condition is satisfied.

8. The voice output device according to claim 7, wherein the voice output controller determines whether a condition in which the person intended to receive the message is not having a conversation in a loud voice is satisfied to determine whether the start condition is satisfied.

9. The voice output device according to claim 7, wherein the voice output controller monitors whether the start condition is satisfied after causing the voice output unit to suspend voice output of the message, and causes the voice output unit to start voice output of the message when the start condition is satisfied.

10. The voice output device according to claim 1, wherein the predetermined space is an in-vehicle space formed in a vehicle.

11. A voice output method for a voice output device that is disposed in a predetermined space and that includes a voice output unit outputting voice through a speaker, the voice output method comprising:
    receiving a message by a message reception unit of the voice output device; and
    determining, by a voice output controller of the voice output device that is configured to provide voice output of the message, when the message reception unit receives the message, whether a start condition of when a person intended to receive voice output of the message normally is able to listen to voice in the predetermined space is satisfied, and causing the voice output unit to start voice output of the message when the start condition is satisfied and suspend voice output of the message when the start condition is not satisfied.

12. The voice output method according to claim 11, wherein
    the voice output controller monitors whether the start condition is satisfied after causing the voice output unit to suspend voice output of the message, and causes the voice output unit to start voice output of the message when the start condition is satisfied.

13. The voice output method according to claim 11, wherein the voice output controller determines whether a condition in which the person intended to receive the message is in the predetermined space is satisfied to determine whether the start condition is satisfied.

14. The voice output method according to claim 11, wherein
the voice output controller determines whether a condition in which the person intended to receive the message is not in a sleeping state is satisfied to determine whether the start condition is satisfied.

15. The voice output method according to claim 11, wherein
the voice output controller determines whether a condition in which the person intended to receive the message is not making a phone call is satisfied to determine whether the start condition is satisfied.

16. The voice output method according to claim 11, wherein
the voice output controller determines whether a condition in which the person intended to receive the message is not having a conversation is satisfied to determine whether the start condition is satisfied.

17. A voice output device disposed in a predetermined space, the voice output device comprising:
a voice output unit configured to output voice through a speaker,
a message reception unit configured to receive a message;
an imaging device for capturing an image of a region including a person intended to receive the message in the predetermined space; and
a voice output controller configured to provide voice output of the message and to determine, when the message reception unit receives the message, whether a start condition of when a person intended to receive voice output of the message normally is able to listen to voice in the predetermined space is satisfied, and cause the voice output unit to start voice output of the message when the start condition is satisfied and suspend voice output of the message when the start condition is not satisfied.

18. The voice output device according to claim 17, wherein
the voice output controller determines whether a condition in which the person intended to receive the message is not in a sleeping state is satisfied to determine whether the start condition is satisfied.

19. The voice output device according to claim 18, wherein
the voice output controller monitors whether the start condition is satisfied after causing the voice output unit to suspend voice output of the message, and causes the voice output unit to start voice output of the message when the start condition is satisfied.

20. The voice output device according to claim 17, wherein
the voice output controller determines whether a condition in which the person intended to receive the message is in a relaxing state is satisfied to determine whether the start condition is satisfied.

21. The voice output device according to claim 20, wherein
the voice output controller monitors whether the start condition is satisfied after causing the voice output unit to suspend voice output of the message, and causes the voice output unit to start voice output of the message when the start condition is satisfied.

* * * * *